United States Patent [19]

Kormos et al.

[11] 3,814,380
[45] June 4, 1974

[54] ADJUSTABLE BODY SEAT FOR BUTTERFLY VALVES

[75] Inventors: Kalman Kormos, North Scituate; Dezso Szilagyi, Cranston, both of R.I.

[73] Assignee: General Signal Corporation, Rochester, N.Y.

[22] Filed: Nov. 20, 1972

[21] Appl. No.: 308,218

Related U.S. Application Data

[63] Continuation of Ser. No. 125,047, March 7, 1971, abandoned.

[52] U.S. Cl. .............................................. 251/307
[51] Int. Cl. ............................................ F16k 1/226
[58] Field of Search .......... 251/170, 171, 306, 307; 137/315; 277/102, 108, 112, 117, 142

[56] References Cited
UNITED STATES PATENTS

| | | | |
|---|---|---|---|
| 1,973,809 | 9/1934 | Heggem | 277/112 X |
| 3,144,040 | 8/1964 | White | 251/171 X |
| 3,171,429 | 3/1965 | Sturmer et al. | 251/170 X |
| 3,209,778 | 10/1965 | Flohr | 251/170 X |
| 3,290,001 | 12/1966 | Taylor | 251/306 |
| 3,393,697 | 7/1968 | Fawkes | 137/315 |
| 3,608,912 | 9/1971 | Templin et al. | 277/102 X |

Primary Examiner—Henry T. Klinksiek
Attorney, Agent, or Firm—Jeffrey S. Mednick

[57] ABSTRACT

The disclosure concerns a butterfly valve having a resilient, adjustable body seat for the pivoting disc. The seat comprises an elastomeric ring which is confined at one end by the transverse wall of an annular groove in the valve body and at the other end by a clamping ring which slides along the wall of the flow passage extending through the body. The clamping ring is forced against the seat ring by a plurality of individual screw actuators spaced around its circumference, and therefore selected portions of the seat ring can be compressed as needed to produce a leak-free seal around the entire periphery of the pivoting disc.

14 Claims, 6 Drawing Figures

3,814,380

1

ADJUSTABLE BODY SEAT FOR BUTTERFLY VALVES

This is a continuation of application, Ser. No. 125,047, filed Mar. 17, 1971, now abandoned.

BACKGROUND AND SUMMARY OF THE INVENTION

A common kind of butterfly valve used in water and waste treatment and industrial processes employs an elastomeric (e.g. rubber) seat mounted in the valve body and arranged to coact with a rigid valving edge on the rotatable valve disc. In tight closing valves, the seal between the disc and seat must be adequate to prevent the formation of air bubbles in a liquid-filled space at the downstream side of the disc when the upstream side is subjected to air pressure of a prescribed level. This requirement is satisfied by manufacturing the valve so that there is an interference fit between the disc and the seat. The degree of interference increases with the pressure rating of the valve, and consequently so too does the level of the torque needed to move the disc between the open and closed positions. If the degree of interference is not adjustable, it is necessary either to manufacture all valves with the interference needed for service at the highest pressure rating, or to produce a series of valves having different disc-seat interferences. Neither of these alternatives is attractive because the first imposes severe torque penalties on valves used at lower pressure levels, and the second tends to increase manufacturing costs. Moreover, both alternatives have the disadvantage of requiring a degree of interference sufficient to insure that a tight seal is provided throughout the disc-seat interface even under the worst condition of tolerance build-up. This, of course, means that most of the valves will have more interference than needed, and consequently will require unnecessarily large actuating torques.

The difficulties just mentioned highlight the desirability of providing a seat construction which allows localized adjustment of interference around the entire discseat interface. Accordingly, several prior valves have incorporated such apparatus, examples of which are shown in the following U.S. Pat. Nos.:

3,144,040 granted Aug. 11, 1964
3,197,174 granted July 27, 1965
3,260,496 granted July 12, 1966
3,314,642 granted Apr. 18, 1967
3,393,697 granted July 23, 1968

Unfortunately, all of the prior proposals are rather expensive, being, in general, characterized by numerous parts, or by costly body-machining operations, such as the drilling of radial holes, or by both of these undesirable attributes.

The object of this invention is to provide an improved adjustable seat construction which is inexpensive to manufacture, provides uniform pressure between seat and disc, and thus can be operated with minimum torque, and allows replacement of the rubber seat in the field. In the new construction, the seat is in the form of an elastomeric ring which is only partially confined in an annular groove formed in the body and spaced axially from the disc shaft. A transverse end face of the seat ring projects into the flow passage extending through the body and engages the conforming end face of a clamping ring which is fitted to slide along the wall of that passage. The clamping ring is pressed axially against the seat ring, to thereby compress the latter against a wall of the body groove and bulge its seating surface inward against the disc, by a series of screw actuators spaced around its circumference. Each actuator includes a threaded element which reacts between a portion of the ring and a transverse body surface formed either by a continuous groove or by a recess cut in the body. The seat ring cross section is uniform and is free of perforations, and the mating face of the clamping ring is uninterrupted; therefore selective adjustment of the screw actuators can produce substantially uniform disc-seat contact pressure around the entire circumference of the disc. Moreover, since the various grooves or recesses in the valve body can be formed by turning or milling operations, and the threaded elements of the actuators need not be screwed into tapped holes in the body, machining costs are kept to a relatively low level. Thus, the invention accomplishes the desired result of affording interference adjustability in a more economical manner than heretofore possible.

BRIEF DESCRIPTION OF THE DRAWINGS

Several embodiments of the invention are described herein with reference to the accompanying drawings in which.

DESCRIPTION OF THE EMBODIMENT OF FIGS. 1 AND 2

Figure 1:
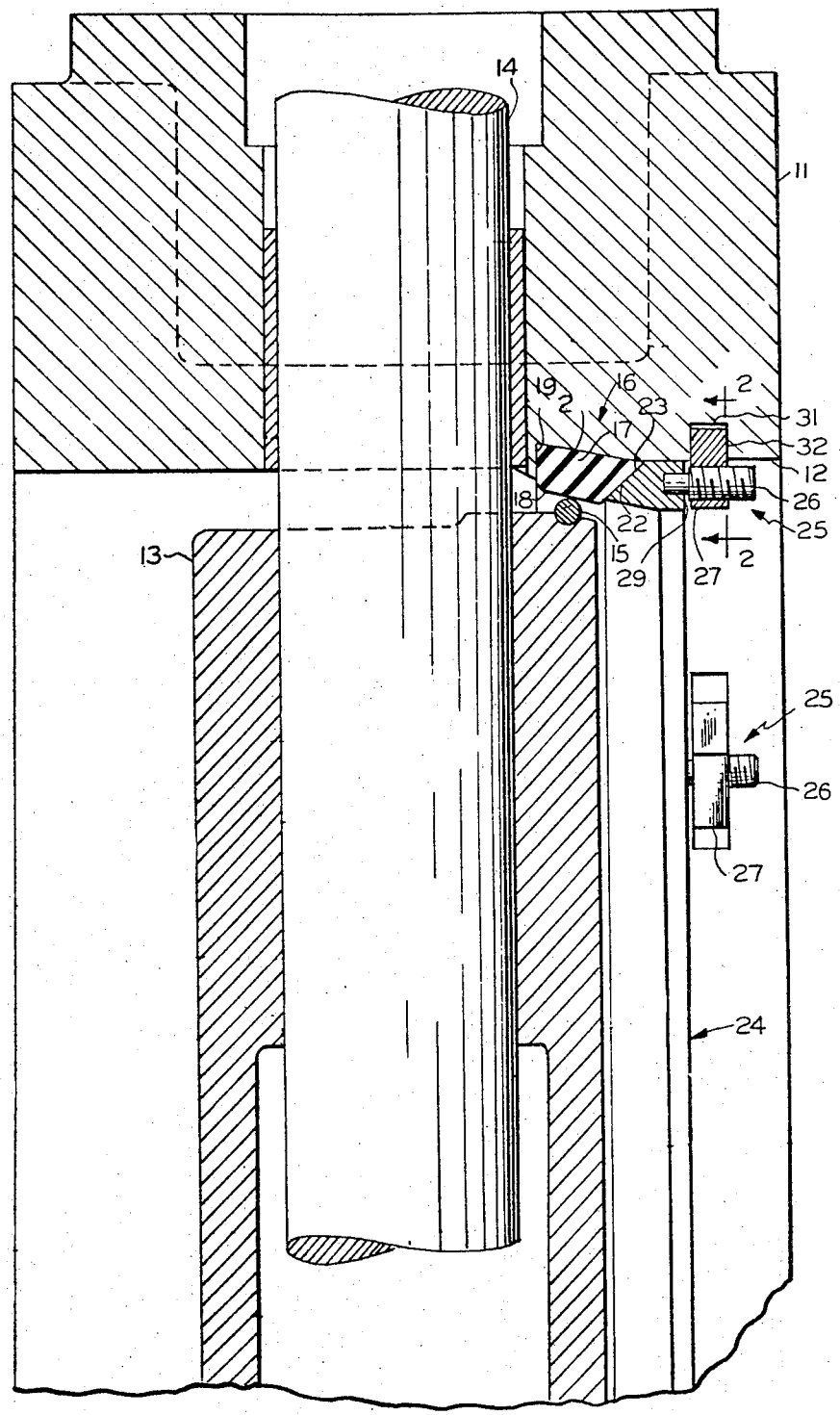
FIG. 1 is a partial axial sectional view of a butterfly valve incorporating one version of the new seat construction.
Figure 2:
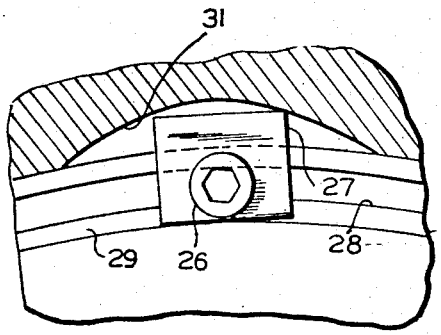
FIG. 2 is a sectional view taken on line 2—2 of FIG. 1.

Referring to FIGS. 1 and 2, the illustrated butterfly valve comprises a cast iron, cylindrical body 11 formed with a through flow passage 12, and circular disc 13 carried by a rotary shaft 14 which is supported by bearings mounted in body 11. The disc 13, which also is made of cast iron, is provided with a rounded, corrosion resistant valving edge 15 which is adapted to move into and out of sealing engagement with the improved body seat of the present invention. The preferred valving edge 15 is a stainless steel ring which is shrink fitted into a groove in disc 13 in accordance with the teachings in application, Ser. No. 130,707, filed Apr. 2, 1971, but other known valving edge designs may be used.

The new seat construction 16 includes a seat ring 17 of trapezoidal cross section which is made of rubber or other elastomeric material suitable for the service for which the valve is intended, and is provided with a conical or spherical seating surface 18. The seat rings for valves up to 48" in diameter are molded in one piece, whereas the seats for larger valves are made from several molded pieces which are joined together end-to-end by vulcanization. A portion of seat ring 17 is received by, and fills, an annular groove formed in body 11 and bounded by a pair of intersecting walls 19 and 21. In accordance with specifications of the American Water Works Association, ring 17 is bonded in place with an epoxy adhesive. The body groove 19, 21 is spaced axially from the disc shaft 14 so that seat 17 can be an endless ring free of shaft-encircling portions which increase operating torque, but the groove preferably is located as close as possible to the shaft in order to minimize the thickness of disc 13. This goal is achieved in the illustrated embodiment by using a groove wall 19 which lies in a radial plane. The radial wall also is preferred because it is easier to machine than one which is undercut. Groove wall 21, on the other hand, is conical.

Seat ring 17 has a conical end face 22 which projects inward from the wall of passage 12 and is engaged by a similarly formed end face 23 of a clamping ring 24. Ring 17, wall 19 and clamping ring 24 define a dovetail, so the seat ring is mechanically, as well as adhesively, locked in place. Clamping ring 24 is dimensioned to slide along the cylindrical wall of passage 12 and is urged into contact with seat ring 17 by a series of screw actuators 25 spaced uniformly around its circumference. Each actuator 25 comprises a dog point set screw 26 which is threaded into a clamping block 27 and engages the bottom wall of a continuous groove 28 formed in the end face 29 of clamping ring 24. The clamping blocks 27 are set into straight sided recesses 31 formed in body 11 and react against the surfaces 32 of the recesses when the set screws are turned to force clamping ring 24 against seat ring 17. Clamping ring 24, set screws 26 and blocks 27 should be made of corrosion resistant material, such as stainless steel, in order to permit seat adjustment and replacement in the field even after long periods of service. The number of actuators 25 employed in the valve depends upon valve size and pressure rating. For a typical 20" valve having a pressure rating of 150 p.s.i. (and subjected to a bubble test pressure of 300 p.s.i.), eight actuators 25 employing five-sixteenths inch set screws have proven adequate.

The procedure for adjusting disc-seat interference is as follows:

a. Move the disc 13 to closed position and clamp the valve in a test fixture with its axis vertical and the blocks 27 on the upper side.
b. Turn set screws 26 finger tight.
c. Cover the upper surface of disc 13 with a pool of water.
d. Subject the lower face of disc 13 to air at the required test pressure and note the locations of leaks.
e. Tighten the set screws 26 closest to a leak until it stops, and then stop a leak on the diametrically opposite side of the disc.
f. Repeat step e until all leaks are stopped.
g. Maintain air pressure for 5 minutes and retighten the set screws 26 adjacent any new leaks which develop.

While, in this procedure, pressure is applied to the side of disc 13 opposite body seat 16, it should be understood that this is done solely to facilitate adjustment of actuators 25, and that the valve can be used in service to handle flow in either direction.

In the adjustment process, leaks are stopped, and the required disc-seat interference is produced, as a result of the inward bulging of seating surface 18 which occurs as seat ring 17 is compressed between groove wall 19 and clamping ring 24. This bulging effect is adversely affected by the presence of voids within the cavity defined by walls 19 and 21 and clamping face 23; therefore, it is important that the molded cross section of ring 22 conform rather closely to the cross sectional shape of this cavity.

DESCRIPTION OF THE FIG. 3 EMBODIMENT

In the seat construction 16 shown in FIG. 1, the mating faces 22 and 23 of the seat and clamping rings 17 and 24, respectively, are conical and extend over the entire length of the interface between these parts. This, of course means that the clamping ring can be subjected to large radial forces, and therefore must have a thickness sufficient to resist buckling. On the other hand, it should be noted that the thickness cannot simply be increased at will because most butterfly valve specifications allow only a 1 inch difference between the nominal valve size and the free flow or unobstructed diameter of passage 12. These two conflicting requirements can be satisfied by the FIG. 1 construction in valves up to 42" in diameter, but larger valves require the alternative construction 16a of FIG. 3.

Figure 3:
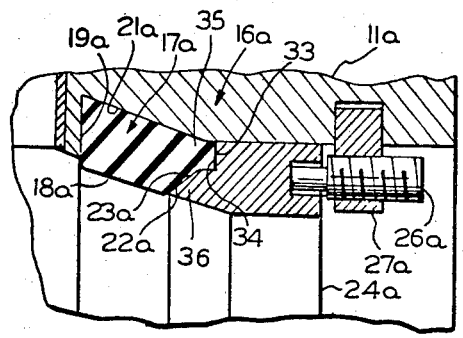
FIGS. 3–5 are partial axial sectional views showing three other versions of the invention.

The FIG. 3 embodiment of the invention is identical to the first version except that only a portion of the interface between seat ring 17a and clamping ring 24a consists of mating conical faces 22a and 23a. The balance of the interface consists of mating radial faces 33 and 34. The conical portion of the interface is located adjacent the inner periphey of seat ring 17a, so the clamping action of ring 24a still has the effect of bulging seating surface 18a as needed to effect a tight seal between the disc and the seat. However, since the force applied to clamping ring 24a through radial face 34 acts in the axial direction, the stress level within the clamping ring can be kept below the allowable limit without the necessity for unduly increasing the radial width of this ring. Moreover, since the two portions of the interface in FIG. 3 are offset axially, the seat ring in this embodiment is molded with a tongue 35 which overlaps a nose portion 36 on clamping ring 24a and defines an improved mechanical lock for holding the seat in place in the body groove 19a, 21a.

DESCRIPTION OF THE FIG. 4 EMBODIMENT

Figure 4:
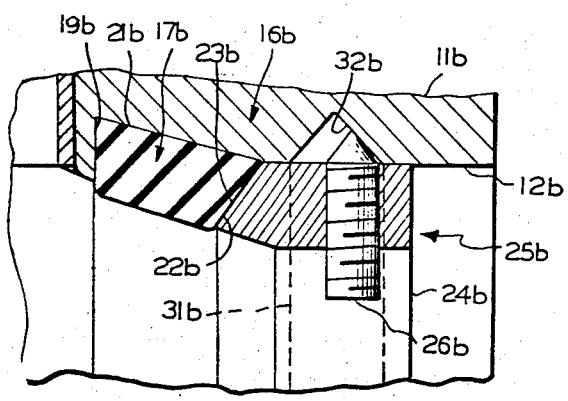
Figure 6:
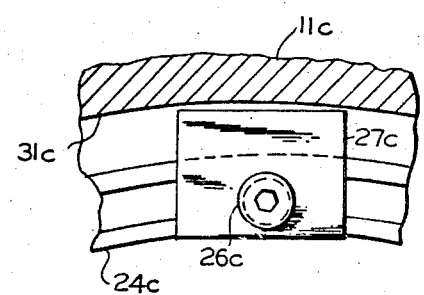
FIG. 6 is a sectional view taken on line 6—6 of FIG. 5.

When the FIG. 1 seat construction is scaled down for use in small valves, the radial thickness of the seat and clamping rings becomes rather small; therefore, the actuators 25 can employ only very small clamping blocks end set screws. Since handling of small screws is not practical in the trade which uses these butterfly valves, it is recommended that the smallest valves in the product line employ the seat construction 16b shown in FIG. 4.

Figure 5:
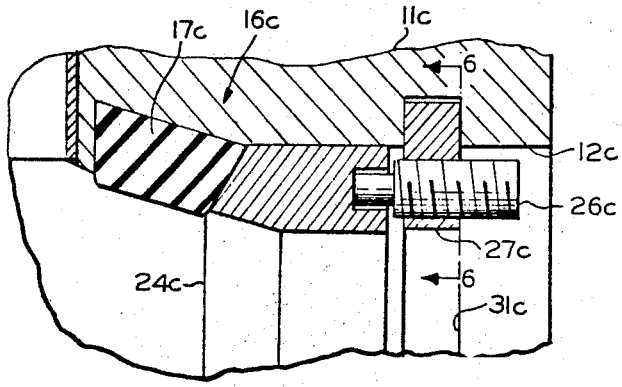

In this alternative version of the invention, each of the actuators 25b includes a cone point set screw 26b which is screwed into a tapped radial hole extending through clamping ring 24b and engages one wall 32b of a V-shaped annular groove 31b formed in valve body 11b. As the set screw 26b is advanced, the clamping ring 24b is forced to the left to compress seat ring 17b, and therefore this embodiment affords the same type of interference adjustment as the other embodiments. However, the size of the set screw here is not dependent upon the radial thickness of ring 24b, and consequently it can be substantially larger than would be possible using the actuator 25 of the FIG. 1 scheme. The FIG. 4 embodiment also affords three other advantages worthy of mention. First, it requires fewer parts. Second, it has no exposed body grooves or recesses, such as the recesses 31 in FIG. 1 or the groove 31c in FIG. 5, in which debris carried by the flowing medium can collect. Finally, seat groove 19b, 21b, V-groove 31b and the cylindrical wall of passage 12b on which clamping ring 24b slides can be machined simultaneously using a single combination milling cutter.

It should be observed that, inasmuch as the hoop stresses in the clamping ring 24b necessarily are much higher than in its counterparts of the other embodiments, use of actuator 25b is confined to rather small valves, e.g., valves having diameters less than about 6 inches.

DESCRIPTION OF THE EMBODIMENT OF FIGS. 5 AND 6

This embodiment is identical to the one shown in FIG. 1 except that the clamping blocks 27c of its actuators 25c are received in an annular body groove 31c, rather than in separate recesses. Thus, as in the case of the last embodiment, all of the body machining required for the improved seat construction can be done using a single combination milling cutter. However, this design does have the disadvantage of increasing the length of exposed body channel in which debris can collect.

We claim:

1. In a butterfly valve including a body containing a through flow passage, and a pivoting disc which cooperates with a seat to control flow through the passage, an improved seat arrangement which comprises
   a. a continuous annular groove formed in the wall of said passage and encircling the axis of the passage;
   b. an elastomeric seat ring mounted in and filling the groove and having an inner peripheral surface which serves as a seating surface for the disc, and transverse end faces at opposite sides of the seating surface, the first end face conforming to and bearing against a transverse wall of the groove and the second end face projecting inward from the wall of said passage;
   c. an endless clamping ring fitted to slide along the wall of said passage and formed with an end clamping face which conforms to and engages the second end face of the seat ring; and
   d. a plurality of individual actuators spaced from one another in the direction of the circumference of the clamping ring and serving to force the ring axially and thereby compress selected portions of the seat ring between the transverse groove wall and the clamping face and produce selective bulging of the seating surface,
   e. each actuator including a screw threaded element which reacts between a portion of the clamping ring and a transverse body surface which extends outward from the wall of said passage.

2. The improvement defined in claim 1 in which
   a. the groove is bounded by said transverse wall, and by a conical wall which intersects the wall of said passage;
   b. said second end face of the seat ring includes at least a portion adjacent the inner periphery which is conical; and
   c. the seat ring is of trapezoidal shape in cross section and the longer one of its parallel sides lies along the conical wall, whereby the seat ring is mechanically held in said groove by the cooperative action of the transverse groove wall and the end clamping face of the clamping ring.

3. The improvement defined in claim 2 in which said transverse groove wall lies in a plane normal to the axis of said passage.

4. The improvement defined in claim 2 in which the second end face of the seat ring and the mating end face of the clamping ring are conical surfaces.

5. The improvement defined in claim 2 in which the second end face of the seat ring and the mating end face of the clamping ring are partly conical and partly radial.

6. The improvement defined in claim 5 in which the radial and conical portions of the mating faces of the seat and clamping rings are axially offset to provide a tongue on the seat ring which is held against the valve body by the clamping ring.

7. The improvement defined in claim 1 in which each actuator comprises
   a. a recess extending into the valve body from the wall of said passage and having a side wall which constitutes said transverse body surface;
   b. a clamping block set into the recess and having a projecting portion containing a through, threaded opening aligned with the clamping ring; and
   c. said threaded element which is screwed into the opening and has an end which bears against the clamping ring at the end opposite the clamping face.

8. The improvement defined in claim 7 in which said recesses are separate from one another.

9. The improvement defined in claim 7 in which said recesses are interconnected and form a continuous annular groove extending around the passage.

10. The improvement defined in claim 7 in which
    a. said groove is bounded by said transverse wall, and by a conical wall which intersects the wall of said passage;
    b. said second end face of the seat ring includes at least a portion adjacent the inner periphery which is conical; and
    c. the seat ring is of trapezoidal shape in cross section and the longer one of its parallel sides lies along the conical wall, whereby the seat ring is mechanically held in said groove by the cooperative action of the transverse groove wall and the end clamping face of the clamping ring.

11. The improvement defined in claim 1 in which each actuator comprises
    a. a threaded radial opening extending through the clamping ring;
    b. a recess extending into the valve body from the wall of said passage and covered by the clamping ring, the recess having an inclined wall which constitutes said transverse body surface; and
    c. said threaded element which is screwed into the opening and has a conical end which bears against the inclined wall of the recess.

12. The improvement defined in claim 11 in which the recesses are interconnected and form a continuous annular groove of V-shape in cross section which extends around the passage.

13. The improvement defined in claim 11 in which
    a. said groove is bounded by said transverse wall, and by a conical wall which intersects the wall of said passage;

b. said second end face of the seat ring includes at least a portion adjacent the inner periphery which is conical; and c. the seat ring is of trapezoidal shape in cross section and the longer one of its parallel sides lies along the conical wall, whereby the seat ring is mechanically held in said groove by the cooperative action of the transverse groove wall and the end clamping face of the clamping ring.

14. In a butterfly valve including a body containing a through flow passage, and a pivoting disc which cooperates with a seat to control flow through the passage, an improved seat arrangement which comprises a. a continuous annular groove formed in the wall of said passage and encircling the axis of the passage;

b. an elastomeric seat ring mounted in the groove and having an inner peripheral surface which serves as a seating surface for the disc, and transverse end faces at opposite sides of the seating surface, the first end face conforming to and bearing against a transverse wall of the groove;

c. a clamping ring mounted in said passage for sliding movement along its wall and formed with an end clamping face which engages the second end face of the seat ring; and d. a plurality of individual actuators spaced around the clamping ring and arranged to force the ring axially and thereby compress selected portions of the seat ring between the transverse groove wall and the clamping face and produce selective bulging of the seating surface, each actuator including a screw threaded element which reacts between a portion of the clamping ring and a transverse body surface which extends outward from the wall of said passage.

* * * * *